May 11, 1926. 1,584,320
J. W. OWENS
METHOD AND APPARATUS FOR TESTING MATERIALS
Original Filed Feb. 3, 1920
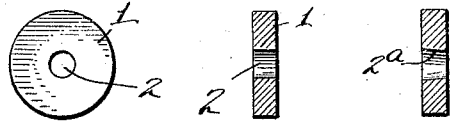
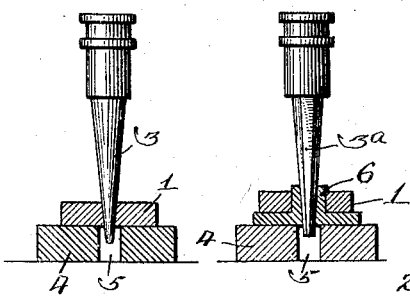
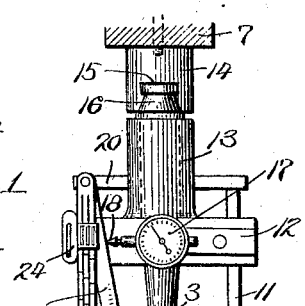
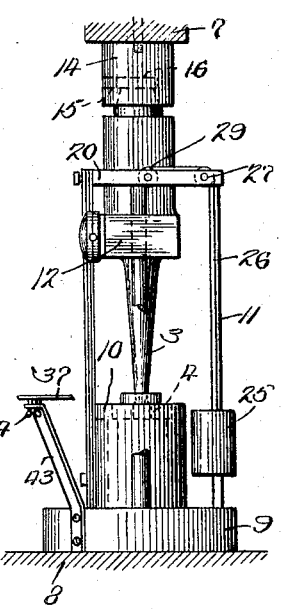
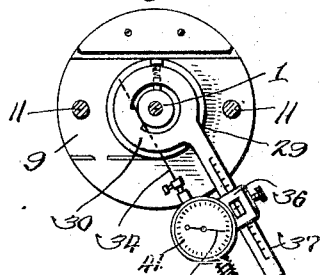
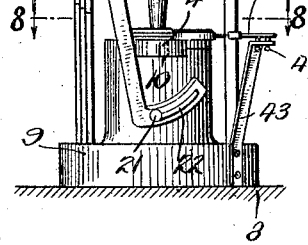
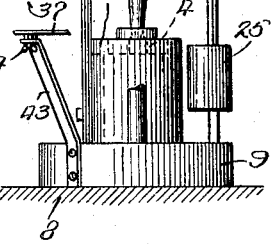
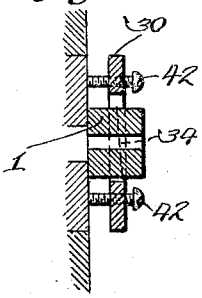
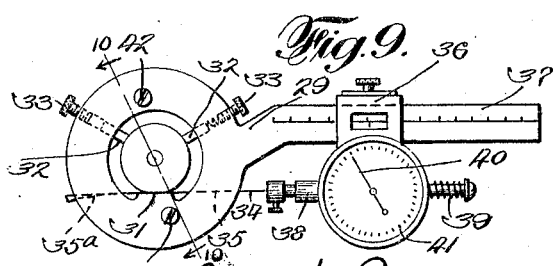
James W. Owens Inventor
By his Attorneys
Prindle, Wright & Small Patented May 11, 1926.

1,584,320

UNITED STATES PATENT OFFICE.

JAMES W. OWENS, OF CRADOCK, VIRGINIA, ASSIGNOR TO TINIUS OLSEN TESTING MACHINE COMPANY, OF PHILADELPHIA, PENNSYLVANIA, A CORPORATION OF PENNSYLVANIA.

METHOD AND APPARATUS FOR TESTING MATERIALS.

Original application filed February 3, 1920, Serial No. 356,064. Divided and this application filed August 19, 1921. Serial No. 493,537.

The invention has for an object to provide a method and apparatus for testing materials which shall be applicable to test specimens of small size, particularly specimens of annular or ring like shape, to the end that the qualities of the material such as its tensile strength, ductility, or the like may be determined accurately without requiring unduly large test pieces or elaborate equipment.

In my co-pending application, Serial No. 356,064, filed February 3, 1920, entitled Method for use in connection with the testing of materials, of which application the present case is a division, I have disclosed a method of obtaining test specimens from a completed or finished structure without undue impairment or mutilation thereof, and the present invention, while not limited in application to test specimens obtained in the above manner, is particularly advantageous as used in connection therewith.

This invention also includes the provision of suitable tools and appliances whereby testing operations such as are above mentioned may be efficiently carried out to obtain the desired data on the qualities of the material to be tested.

Further objects and advantages of the invention will be in part obvious and in part specifically pointed out in the description hereinafter contained, which, taken in connection with the accompanying drawings, discloses a preferred method and apparatus for testing materials in accordance with the invention; such disclosure, however, is to be considered merely as typical of its principle.

In the drawings:

Figs. 1 and 2 are respectively a front view and a central section of a test specimen adapted to be tested in accordance with the invention.

Fig. 3 is a central section showing a modified form of test specimen.

Fig. 4 shows a plug in operative position to test a specimen such as is shown in Figs. 1 to 3.

Fig. 5 shows a modification in the manner of applying such a plug to a test specimen.

Figs. 6 and 7 are front and side views respectively showing a test specimen in position to be tested in a testing machine, in accordance with the invention.

Fig. 8 is a section on line 8—8 of Fig. 6 looking in the direction of the arrows.

Fig. 9 is a plan view of a ductility gage adapted to be used in connection with the testing machine illustrated in Figs. 6 and 7.

Fig. 10 is a section on line 10—10 of Fig. 9 looking in the direction of the arrows.

In accordance with the present invention, I employ for test specimens annular or ring-shaped pieces such as the piece 1 of Figs. 1 and 2 having a central hole 2. These specimens may be cut from a metal plate, a welded joint, or the like, and are finished accurately to the desired thickness and diameter, for instance as described in greater detail in my co-pending application above mentioned, or in any other suitable manner.

I then subject the test pieces to outwardly or radially directed forces in such manner that the material therein is stressed by forces extending around the hole 2 and tending to expand or burst the ring along radial lines. These strains in the material approximate those which are obtained by applying tension to a straight test bar, and the tensile strength of the material may be determined by observance of its behavior under the action of the radial forces above described.

I prefer to apply stresses of the above character to the test pieces by means of a tapered plug 3 as indicated in Fig. 4, the test piece 1 being seated upon a die 4 having a hole 5 therein alined with the hole 2 of the test piece. Thus when measured forces are applied to the tapered plug 3 tensile stresses are set up in the test piece throughout its entire cross section, and the cross sectional area of the test piece being known, the tensile strength of the material may be determined from its behavior under test. If desired, the hole within the test piece 1 may be given a taper 2ª as indicated in Fig. 3, to correspond to the taper of plug 3. If this is done the plug will tend less to crush the walls of the hole as it is forced into the test piece. Or as indicated in Fig. 5, a plurality of sector-like wedge members 6 having their outer surfaces cylindrically curved to fit the hole 2 of the test ring and their inner surfaces flat to fit a polygonal tapered plug 3ª may be interposed between the specimen 1 and the plug, thus avoiding the tendency of the plug to crush the inner walls of the specimen and reducing friction to a large extent with the result that a greater proportion of the force applied to the plug is transformed into tensile stresses in the ring of the test piece.

In Figs. 6 and 7 a plug testing device such as is above described is shown as embodied in a testing apparatus adapted to be interposed between the opposed heads 7 and 8 of a testing machine. The testing apparatus as a whole is carried upon a base 9 having a recess 10 adjacent its top surface within which rests a die 4 of the character previously described. A plurality of posts 11 extend from the base 9 and slidably support a cross head 12 which carries the tapered plug 3. In the present form, the cross head 12 has a hollow hub 13 within which the tapered plug 3 may be inserted with its outer end projecting beyond the hub and seated against the same. A cap 14 having a recess 15 corresponding to the shape of head 16 on tapered plug 3 is attached to the head 7 of the testing machine in such manner that the testing apparatus carried as a whole by base 9 may readily be slid into and out of position between the heads 7 and 8. The apparatus is carefully made so that the hole within the hub 13 will accurately aline the tapered plug 3 with the hole 5 in die 4, thus placing uniform stresses upon the test ring 1 when the plug 3 is advanced into it.

The apparatus is arranged to indicate the distance which plug 3 penetrates into the test specimens during test, for instance by providing a micrometer dial 17 upon cross head 12, the finger 18 of the micrometer bearing against a stationary inclined straight edge member 19 so that the micrometer indicates the amount of vertical movement of the cross head and tapered plug while the test is being carried on. The straight edge member 19 preferably is pivoted to an end plate 20 at the upper end of guide posts 11 and it is angularly adjustable at its lower end as by means of the set screw 21 extending through a slot 22 in the straight edge 19 and clamping the straight edge against base 9. If the specimen to be tested is exceedingly ductile, the movement of plug 3 into the specimen may be relatively great so that a slight taper of straight edge 19 may be secured by adjustment of screw 21; or if the test specimen is very brittle a greater inclination of the straight edge 19 will be desirable in order to magnify the reading of the micrometer dial 17 after a relatively small movement of tapered plug 3 into the test specimens. If desired, the downward movement of the tapered plug 3 may also be registered on a plurality of fixed indicator bars 23 over which moves a sight 24 carried on cross head 12. The readings on each indicator bar show the amount of downward movement of a plug having a certain taper for the corresponding position and cross head 12.

A counter-weight 25 (Fig. 7) is secured to cross head 12 by means of a cord 26 passing over rollers 27 and 28, such counter-weight enabling greater accuracy to be obtained in the readings of force applied to the test specimen, since it removes the weight of the cross head, tapered plug, etc., from the ring while the latter is under test, and also prevents a sudden fall of the cross head at any time.

It has been found that the behavior of the ring specimen when subjected to the plug test above described gives a very reliable indication of the tensile strength of the material of which the ring is formed, the values obtained by the test bearing a substantially constant relation with those which are obtained when the material is subjected to the ordinary elongation tests of a testing machine. In fact, the stresses set up by the two tests are quite similar, particularly if friction between the tapered plug and the hole 2 of the test specimen is reduced as much as possible. However, the test is much simpler than the elongation test above referred to both in regard to the ease with which the specimens can be obtained and the application of the stresses to the test piece, which may be done in the plug test by the application of pressure as distinguished from tension.

The test may also be employed to determine the ductility of the specimen either alone or in connection with the determination of the tensile strength thereof. This is accomplished by measuring the increase in periphery of the test specimen when the tapered plug is forced into the same. As shown more in detail in Figs. 9 and 10, the change in periphery of the specimen may be measured by means of a gage 29 having a body portion 30 adapted to surround the test piece 1 and preferably having means for positioning the test piece centrally within the gage. In the form illustrated, a fixed abutment 31 on the body portion cooperates with a pair of spring pressed plungers 32 adjustable by thumbscrews 33, to bring the test specimen into central position within the gage when the latter is applied to the specimen. The gage comprises a flexible band 34 adapted to be looped around the specimen together with means for indicating changes in the effective periphery of said loop. In the present embodiment, the band consists of a fine steel spring passing through a slot 35 within the body portion 30 of the gage and encircling the test specimen with the free end of the band suitably fixed within a slot 35ª in alinement with the slot 35 previously described. The remaining end of band 34 is attached to a measuring device such as a micrometer mounted on a strap 36 which slides along a graduated arm 37 extending from body portion 30 of the gage. The band 35 is attached to a reciprocable plunger 38 of the micrometer, the plunger 38 being pressed outwardly by a spring 39 to maintain the band 34 taut during the operation of the gage and to insure that any change of shape of the test specimen will be accurately recorded and indicated by micrometer pointer 40 moving over the dial 41.

As appears particularly in Fig. 10, a plurality of screws 42 or some similar device may be used to maintain the body portion 30 of the gage level in the testing machine. A bracket 43 (Figs. 6 and 7) supports the graduated arm 37 of the gage, adjusting screws 44 being provided to bring the arm to a horizontal position. Thus, as the test specimen expands under the stresses applied on tapered plug 3, its changes in periphery are indicated by pointer 40. The applied stresses, the cross sectional area of the ring, and its increase in periphery due to the stress all being known, the test therefore indicates the ductility of the material under test.

While certain preferred embodiments of the invention have been described, it will be obvious that many changes may be made therein without departing from the principle of the invention as defined in the following claims.

I claim:

1. The method of testing the strength of finished structures which comprises cutting out a ring-shaped test piece of predetermined cross-sectional area therefrom, inserting a tapering plug into said test piece and applying measured pressure to said plug to force the same into the ring in a direction substantially perpendicular to the plane of the ring and set up tensile stresses therein substantially throughout its cross-sectional area.

2. A testing apparatus comprising a base, a die carried thereby adapted to receive a test piece of annular shape, a plurality of posts extending from said base, a cross head slidable along said posts, and a tapering plug carried by said cross head, said plug being alined with said die, said base and crosshead having opposed faces adapted to engage the opposed heads of the testing machine.

3. A testing apparatus comprising a base, a die carried thereby adapted to receive a test piece of annular shape, a plurality of posts extending from said base, a cross head slidable along said posts having a hollow hub alined with said die, and a tapering plug within said hub having its outer end projecting beyond the hub and seated against the same, said base and crosshead having opposed faces adapted to engage the opposed heads of the testing machine.

4. A testing apparatus comprising a base, a die carried thereby adapted to receive a test piece of annular shape, a plurality of posts extending from said base, a cross head slidable along said posts, a tapering plug carried by said cross head, said plug being alined with said die, and means for measuring the travel of said cross head towards said base, said base and crosshead having opposed faces adapted to engage the opposed heads of the testing machine.

5. A testing apparatus comprising a base, a die carried thereby adapted to receive a test piece of annular shape, a plurality of posts extending from said base, a cross head slidable along said posts, a tapering plug carried by said cross head, said plug being alined with said die, and means for measuring the travel of said cross head towards said base, said means comprising a straight edge member inclined to the path of travel of the cross head and a micrometer cooperating therewith.

6. A testing apparatus comprising a base, a die carried thereby adapted to receive a test piece of annular shape, a plurality of posts extending from said base, a cross head slidable along said posts, a tapering plug carried by said cross head, said plug being alined with said die, and means associated with said apparatus for measuring the increase in periphery of a test piece when in position on said die.

7. A testing apparatus comprising a base, a die carried thereby adapted to receive a test piece of annular shape, a tapering plug alined with said die, and a plurality of sector like wedge members adapted to fit within an annular test piece, said wedge members having their inner surfaces tapered to fit around said plug.

8. A testing apparatus comprising a base, a die carried thereby adapted to receive a test piece of annular shape, a tapering polygonal plug alined with said die, and a plurality of sector like wedge members adapted to fit within an annular test piece, said wedge members having flat inner surfaces tapered to fit around said plug and having outer surfaces of arcuate curvature.

9. A testing apparatus comprising a base, a die carried thereby adapted to receive a test piece of annular shape, a crosshead carrying a tapering plug, means for guiding said crosshead to slide to and from the base with the plug alined with the die, said base and crosshead having opposed faces adapted to engage the opposed heads of a testing machine.

In testimony that I claim the foregoing, I have hereunto set my hand this 22 day of July, 1921.

JAMES W. OWENS.